Patented Sept. 26, 1933

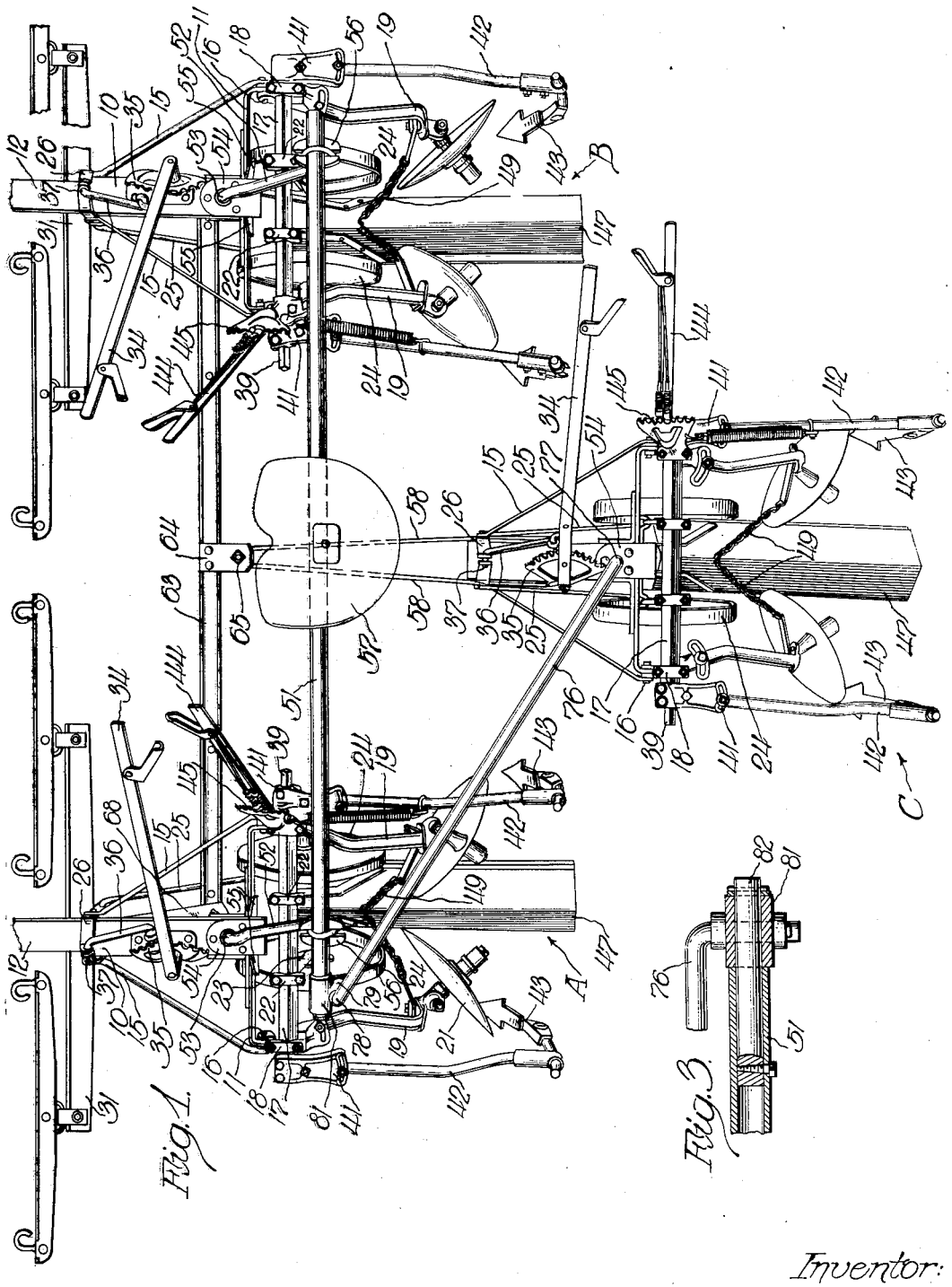

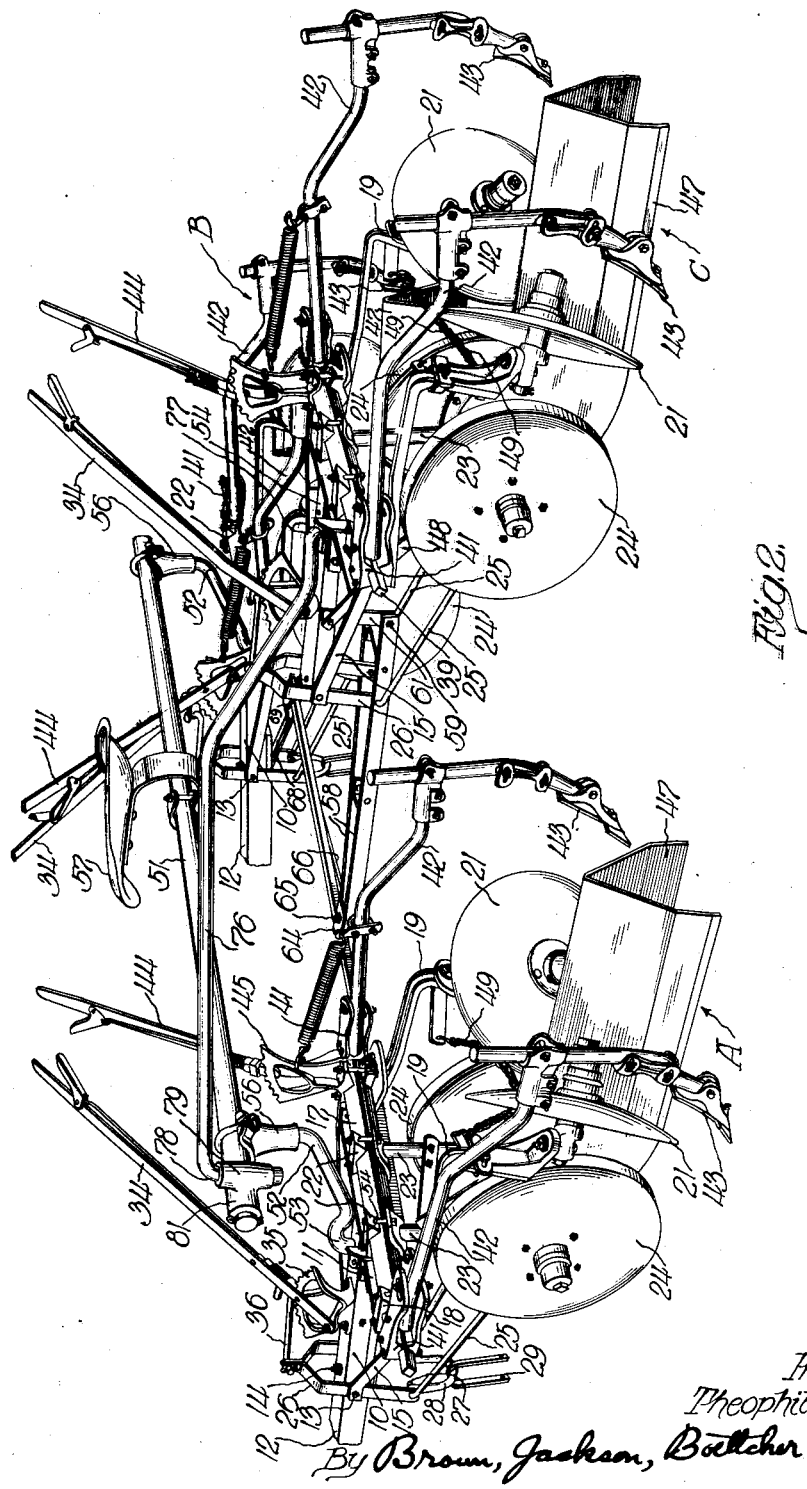

1,928,308

UNITED STATES PATENT OFFICE 1,928,308

LISTER CULTIVATOR

Theophilus Brown, Moline, Ill., assignor to Deere & Company, Moline, Ill., a corporation of Illinois Original application October 24, 1927, Serial No. 228,142. Divided and this application September 12, 1932. Serial No. 632,702

16 Claims. (Cl. 97—143)

This application is a division of the co-pending application filed by Carl G. Strandlund, Walter H. Silver and myself October 24, 1927, Serial No. 228,142. The present invention is principally concerned with the provision of a new and improved form of stabilizing means for the gangs of a lister cultivator, particularly lister cultivators of the three-row type having a third or intermediate cultivator gang or unit disposed intermediate the two outer gangs or units.

One of the particular objects of the invention disclosed in the copending application above was to provide such an implement wherein the three cultivator gangs are free to swing transversely, each independently of the others, so that each gang can follow its individual lister row. The lists are usually made with an implement which only makes one or two lists at a time, and, owing to unsteady driving of such implement, it frequently happens that the spacing between adjacent rows will vary considerably. Accordingly, it is important in a multiple row cultivator of this type that the separate cultivator gangs be capable of shifting laterally within certain limits, independently of each other, so that the gangs can accurately follow the lateral deviations in the rows. Such object was attained by an improved method of pivotally connecting the gangs together in proper position and to maintain them in that position, yet which permits the two laterally disposed gangs to swing inwardly or outwardly relatively to each other, and which also permits the intermediate gang to swing to either side independently of the laterally disposed gangs. Briefly, such structure included a transverse draft bar movably supported by the outer units and pivotally connected with the intermediate gang unit.

The principal object of the present invention is the provision of a new and improved stabilizing means for such agricultural units as lister cultivators and the like, particularly lister cultivators of the three-row type, for holding all of the units in proper upright position. Specifically, one object of the invention is to provide a lister cultivator of the above general description which is further characterized by improved stabilizing means acting to steady the individual gangs and to hold the same against lateral tipping. The two wheels which support each gang must be spaced relatively close together to run in the relatively narrow width of the list or trench, and hence such wheels do not give much lateral stability to the gang.

The present construction of implement embodies devices affording a linked connection between the three gangs, which hold each of the gangs against lateral tipping, while still permitting the transverse swinging movement of the gangs, as described above.

These and other objects of the present invention will be apparent from the following detailed description of the preferred structural embodiment, taken in conjunction with the accompanying drawings illustrating such embodiment.

In the drawings:—

Figure 1 is a plan view in perspective of a three-row lister cultivator embodying the principles of the present invention;

Figure 2 is a perspective view of the implement looking at the same from the left rear; and Figure 3 is a detail sectional view showing the manner of connecting the rearwardly extending stabilizing bar with the transversely extending stabilizing bar.

The implement as a whole comprises three lister cultivator gangs, the two outwardly disposed gangs being designated A and B, and the intermediate or center gang being designated C. The two laterally disposed gangs A and B are substantial duplicates, with the exception that one is a left hand unit and the other a right hand unit. The intermediate gang C is similar in construction to the outer gangs A and B, only differing therefrom in the manner of establishing the draft connection with the intermediate gang and in the fact that such intermediate gang has no draft pole, as will hereinafter appear. Accordingly, I shall only describe one of these gangs in detail, and in this regard, attention is directed to the fact that these gangs correspond in their general construction to the gangs illustrated in Patent No. 1,148,613, issued to W. A. Paul on August 3, 1915.

Referring specifically to the gang or unit A, it will be noted that it comprises a frame which is built up of a longitudinally extending channel or frame bar 10 and a transversely extending bar 11 at the rear end thereof. The transverse bar 11 extends across the rear end of the inverted channel bar 10 and is rigidly secured thereto by angle brackets or in any other suitable manner. Extending forwardly from the front end of the channel or frame bar 10 is a draft member or pole 12, the channel bar 10 forming a socket in which the pole is rigidly secured by a horizontally extending bolt 13, which passes through the side flanges of the channel bar and through the tongue, and also by a vertical bolt 14 which passes downwardly through the web of the channel 10 and through the tongue. It will be understood that the other gang unit B also has a draft pole 12 extending forwardly therefrom, which is connected to its channel bar 10 in the same manner.

The aforementioned frame consisting of the channel bar 10 and transverse bar 11 is braced by diagonally extending brace bars or rods 15 which are connected at their forward ends to the horizontally extending bolt 13. The rear ends of these diagonal brace bars are bent rearwardly and are provided with openings to receive bolts 16 which connect the ends of the bars 11 and 15. The bolts 16 also constitute pivots on which a tool carrying frame is pivotally mounted. Such tool carrying frame comprises primarily a tubular bar 17, preferably of square cross-section. Secured to the opposite ends of such bar are clamp devices or bracket members 18 which are clamped to the outer surface of the bar and which have forwardly extending pivot eyes having pivotal mounting on the bolts 16. Thus the tool carrying bar 17 and the frame 10—11 are capable of vertical pivotal movement relative to each other about the axis of the bolts 16.

Pivotally connected for horizontal swinging movement to the under sides of the two brackets 18 are rearwardly extending arms 19 which carry suitable earth working tools at their rear ends. In the arrangement shown, I have illustrated discs 21 as being mounted on the arms 19, but it will be evident that shovels or any other desired type of earth working devices may be mounted on these arms in lieu of the discs 21. The arms 19 are adapted to be swung inwardly or outwardly to vary the distance between the earth working tools carried thereby, and to be clamped in any adjusted position by a suitable arrangement of clamping bolt engaging in a curved slot in the bracket 18, the details of which need not be described as they are old and well known. It will also be understood that the earth working tools can be set at different angles with respect to their supporting arms 19.

Secured in spaced relation to the intermediate portion of the tubular bar 17 are two clamping devices 22 from which depend vertical standards 23. The lower ends of these two standards have outwardly extending axle spindles upon which are journaled bell wheels 24—24, which straddle the plant row and which support the tool carrying bar 17. Connected to the wheel carrying standards 23, at points preferably adjacent to the outwardly extending spindle portions, are links 25 which extend upwardly and forwardly to a pivoted yoke 26. For the outer units such yoke comprises two spaced straps 26 which extend down on the opposite sides of the frame bar 10, being pivotally connected thereto by the bolt 13 which extends through both straps 26. These straps extend down below the channel or frame bar 10 and have their lower ends apertured to receive the ends of the links 25, such links having inwardly turned ends 27 which project through the apertures in the straps from the outer sides of the straps. (See Figure 2.) Pivotally mounted upon such inwardly turned ends, between the straps 26, is a clevis 28 with which a second clevis 29 is linked. The latter clevis is adapted to have pivotal connection with a doubletree comprising an evener bar, to the outer ends of which singletrees are pivotally connected. Other forms of draft means may be provided, if desired. It will thus be seen that draft energy effective on the evener bar is transmitted to the lower ends of the straps or yoke members 26, and thence through the links 25 to the bell wheels 24 and to the earth working tools carried by the gang.

The yoke member 26 is held against swinging movement with the draft pull through the instrumentality of a lever 34 which is pivotally supported on a suitable pivot bracket mounted on the upper side of the channel bar 10. The lever carries any suitable latch mechanism adapted to cooperate with a latching sector 35, which sector is formed as part of the pivot bracket on which the lever is mounted. A link 36 is pivotally connected to said lever and extends forwardly for effecting pivotal connection at 37 with the upper end of the yoke 26. The upper ends of the two straps which form said yoke are brought together and the transversely bent end 37 (Figure 1) of the link 36 is passed through openings in such ends of the straps.

It will be evident from the foregoing that by shifting the lever 34 fore and aft the yoke 26 will be rocked on the bolt 13 as a pivot, which will shift the links 25 and thus swing the bell wheels fore and aft about the pivot bolts 16, thereby swinging the tubular frame bar 17 to move the soil engaging tools 21 into or out of engagement with the ground.

Extending through the tubular bar or shaft 17, and rotatable therein, is a second tool carrying shaft 39. The outer ends of the latter shaft are preferably formed square to have brackets 41 firmly clamped therein. Bars or arms 42 extend rearwardly from the brackets 41 and carry suitable earth working tools 43. In the arrangement shown, I have illustrated these earth working tools as being shovels, but it will be evident that discs or any other desired type of cultivating devices may be mounted on the arms 42 instead of these shovels. Provision is made for adjusting the two arms 42 of each gang or unit inwardly or outwardly with respect to the unit so as to vary the distance between the earth working tools carried thereby, each such adjustment being secured by a suitable clamping bolt carried by the arm which effects clamping engagement in a curved slot in the bracket 41. This adjustment corresponds more or less to the adjustment provided for the arms 19, and need not be described in detail as it is old and well known.

The second set of cultivating devices 43, carried by the arms 42, may be given different depth adjustments relative to the first set of cultivating devices 21 through actuation of a lever 44. This lever is fixedly secured to the inner tool carrying shaft 39 on which the brackets 41 are mounted, and said lever is adapted to have latched engagement with a notched sector 45 which is illustrated as being formed integral with the clamping bracket 18. As previously described, such clamping bracket is secured fast to the outer tubular shaft or bar 17, and hence the latched engagement of the lever 44 with the sector 45 will hold the two shafts 17 and 39 in fixed relation in each other. It will be seen from the foregoing that when the lever 34 is actuated the wheel support, comprising the bell wheels 24 and their standards 23, will be shifted fore and aft and in such movement will raise or lower both sets of cultivating devices 21 and 43, which cultivating devices are carried by the wheel support. It will also be seen that by moving the second lever 44 fore and aft an independent depth adjustment can be given the second set of cultivating devices 43, or these cultivating devices can be raised and lowered for the purpose of shaking trash out of the shovels 43.

Disposed between the two supporting wheels of each gang or unit is a shield 47 which serves to cover the young plants in the bottom of the trench or list, so as to prevent the plants from being covered by the soil or otherwise injured in the cultivating operation. Such shield consists of an inverted angle shaped member, and has draft connection with its gang or unit through the medium of upwardly extending bars 48 which are pivotally connected to the sides of the channel bar 10, as best shown in Figure 2. Said shield is also connected to the tool carrying arms 19 through chains 49.

As mentioned above, the present invention is principally concerned with the provision of a new and improved stabilizing means for the gangs or units comprising the lister cultivator. The stabilizing means for the two outer gangs or units A and B comprises a transversely extending bar 51 and laterally swinging arms or links 52 which pivotally connect the outer portions of the stabilizing bar 51 with the gang units A and B. Each arm or link 52 has a downwardly extending bearing portion, indicated at 53 in Figure 1, which bearing portion extends down into a vertical bearing socket formed in a bracket or plate 54 which is secured to the rear end of the frame channel 10. A relatively long area of bearing engagement is afforded between the bearing portion 53 and the bracket 54 so as to resist twisting stresses set up between the cultivator unit and the arm 52 incident to any tipping tendency of the cultivator unit. Laterally swinging movement of the arm 52, relative to the cultivator unit, is limited by stops 55 which extend upwardly from the frame bar 11 on each side of the bracket plate 54, such stops being spaced sufficiently to permit of the desired lateral shifting movement of the gang in following the lateral deviations in its plant row. The rear end of each arm 52 has an upwardly extending bearing socket (not shown) in which is swiveled a clamping device, indicated generally at 56. This clamping device comprises any suitable arrangement of cooperating clamping parts which rigidly engage around the end portion of the transverse stabilizing bar 51. The pivotal connection between the clamping device 56 and the arm 52 permits of relative shifting movement of the stabilizing bar 51, which occurs when one or the other of the cultivator units swings inwardly or outwardly in following its lister row. It will be evident that the stabilizing bar 51, in cross-connecting the two arms 52 in the manner described, prevents either of these arms from twisting or tipping laterally about a longitudinal axis relative to its individual gang, and hence the arms and stabilizing bar hold the two gangs against lateral tipping, while still permitting said gangs to shift inwardly or outwardly in following their lister rows. Secured to the intermediate portion of the stabilizing bar 51 is the operator's seat 57, from which position the operator can conveniently reach the levers 34 and 44 of the gangs.

Referring now to the connection and operative association of the intermediate cultivator gang C with the two outer gangs A and B, it will be seen from Fig. 1 that the intermediate gang is disposed considerably in rear of the transverse plane of the two outer gangs. Such location of the intermediate gang permits all three gangs to swing laterally in following the deviations in the plant rows without interference between the gangs; and also permits the implement to be turned at the ends of the field without the gangs colliding with each other in such turning movement.

As previously remarked, the intermediate gang is in all material respects a duplicate of the outer gangs A and B, only differing therefrom in its draft connections. These draft connections per se do not form any part of the present invention and for a detailed description reference may be had to the copending application identified above or the copending application (Case 13) of Walter H. Silver, filed November 20, 1931, Serial No. 516,234. For the purposes of the present decription, therefore, it suffices to note that the intermediate gang comprises the frame bar or channel 10 and the pivotally mounted yoke 26, similarly to the outer gangs. Pivotally connected to the outer sides of the yoke bars 26 are a pair of forwardly extending draft members 58. The links 25 have their inwardly turned ends passing through such draft members 58, and through the lower ends of the yoke bars 26, so that the draft pull on the members 58 is transmitted to the links 25, as described of the outer gangs. The draft members 58 extend back beyond the yoke 26 and have their rear ends pivotally connected at 59 to links 61 which extend down from the frame bar 10, such links being pivotally supported on the frame bar to swing with the yoke 26. Thus the draft members 58 have pivotal connection with the frame bar 10 for the center unit through a system of parallel links, which permits of fore and aft swinging of the wheel support through actuation of the lever 34, as previously described of the outer gangs.

The front ends of the draft members 58 have pivotal attachment to the center of a transversely extending draft transmitting structure or draft bar 63. Such pivotal attachment is preferably effected by securing spaced plates 64 to the upper and lower sides of the draft bar, and extending these plates rearwardly therefrom to support a vertical pivot bolt 65. The draft members 58 have looped engagement around the pivot bolt 65 between the plate 64, so that the intermediate gang 6 is free to swing laterally with reference to the draft bar 63, around the axis of the bolt 65. A truss rod 66 is preferably extended along the bottom of the draft bar 63, such truss rod having its ends secured to the draft bar and having its intermediate portion secured to the lower plate 64. The draft which is transmitted to the outer gangs by means of the doubletrees 31 or by any other suitable source of draft is, in turn, transmitted to the outer ends of the draft bar 63 through swingable draft links 68. As best shown in Figure 2, each of these draft links consists of two bars riveted together and having their ends separated to form a clevis 69 which engages over the upper and lower sides of the draft bar 63. The front end of each link 68 is pivotally connected to the under side of the adjacent draft pole 12 on the vertical bolt 14, such bolt passing down through an opening in the end of the link 68. It will be apparent that the swinging link connection between the ends of the draft bar 63 and the two outer gangs A and B will transmit an equalized draft between the three gangs while still permitting each gang to swing or shift transversely in following its lister row. That is to say, by virtue of the pivoted link connection between the outer ends of the draft bar 63 and the outer gangs, relative transverse shifting movement can occur between the draft bar and the gangs so as to permit the two outer gangs to swing inwardly or outwardly, or to permit the intermediate gang to swing to either side, all independently of each other.

It will be understood, of course, that any other form of draft means, preferably although not necessarily equalized draft means, may be utilized if desired. However, the equalized draft structure just referred to is preferable, being the draft means disclosed and claimed as such in the co-pending application of Carl G. Strandlund, Serial No. 576,248, filed November 20, 1931.

The stabilizing means for the intermediate gang C comprises a stabilizing bar or link 76 which extends diagonally forwardly from the intermediate unit to one end of the transverse stabilizing bar 51. The rear end of the stabilizing bar 76 has a downwardly extending bearing portion 77 which extends down into the vertical bearing socket formed in the bracket 54 of the gang frame. Thus the rear end of the bar 76 has pivotal attachment with the intermediate unit, similarly to the pivotal attachment of the arms 52 with the laterally disposed units A and B. The front end of the stabilizing bar 76 has a downwardly extending bearing portion 78 which has bearing engagement in a tubular socket 79 carried on the end of the transverse stabilizing bar. Referring to Figures 1 and 3, it will be seen that the bearing socket 79 is formed on one side of a horizontally extending sleeve 81. The latter is mounted on a short rod or shaft 82 which extends into the open end of the tubular stabilizing bar 51. The inner end of the rod 82 is non-rotatably secured in the stabilizing bar 51 by a screw 83 which passes up through a hole in the bar 51 and threads into a hole in the rod 82.

It will be evident from the foregoing that the rearwardly extending stabilizing bar 76 will hold the intermediate unit C against lateral tipping, while still permitting lateral deviation of such unit in following the lister row. In such lateral movement, the transverse stabilizing bar 51 will be shifted endwise to one side or the other, on the freely swinging arms 52. Such movement of the transverse stabilizing bar will carry the operator's seat 57 in a direction corresponding to the lateral movement of the intermediate gang, so that irrespective of the degree of such lateral movement the operator will always be able to reach the levers 34 and 44 of such unit conveniently.

It will be seen from the foregoing that I have provided a lister cultivator wherein each cultivator unit or gang has flexible connection with the stabilizing means, to the end of permitting each cultivator unit to shift or swing transversely, relatively to the other units, in following its lister row. Thus, while I have shown and described the preferred construction in which the principles of the present invention are preferably embodied, it will be understood that my invention is not to be limited to the specific details shown and described, but that, in fact, widely different means may be employed in the practice of the broader aspects of my invention.

What I claim, therefore, and desire to secure by Letters Patent is:—

1. In a lister cultivator, the combination of three lister cultivator gangs, stabilizing means extending between the two outer gangs for holding the same against lateral tipping, and stabilizing means pivotally connected with the said first-named stabilizing means for lateral swinging movement about a substantially vertical axis and extending from said first named stabilizing means to the intermediate gang for holding the latter against lateral tipping.

2. In a three-row lister cultivator, the combination of three lister cultivator gangs each comprising a wheel support and cultivating devices carried thereby, a stabilizing bar extending transversely between the two outer gangs, arms pivotally supported on said outer gangs for lateral swinging movement and having pivotal connection with the end portions of said stabilizing bar, and a second stabilizing bar having pivotal connection at one end with the intermediate gang for lateral swinging movement, the other end of said second stabilizing bar having pivotal connection with said first stabilizing bar, the pivotal connections of said stabilizing bars permitting said cultivator gangs to shift transversely relatively to each other in following deviations in their plant rows.

3. In a three-row lister cultivator, the combination of three lister cultivator gangs each comprising a wheel support and cultivating devices carried thereby, an adjusting lever on each of said gangs for adjusting said cultivating devices, the two outer gangs being disposed in substantially the same transverse plane, the intermediate gang being disposed in rear of said transverse plane, a stabilizing bar extending transversely between the two outer gangs, arms pivotally supported on said outer gangs for lateral swinging movement and having pivotal connections with the end portions of said stabilizing bar, an operator's seat mounted on said stabilizing bar, and stabilizing means for said intermediate gang having connection with said stabilizing bar whereby transverse movement of said intermediate gang will cause corresponding movement of the operator's seat, thereby retaining the operator's position in proximity to the adjusting lever on said intermediate gang in the transverse movement of said gang.

4. In a lister cultivator, in combination, two outer cultivator gangs and an inner gang staggered relative to the outer gangs, means pivotally connecting all of said gangs for relative lateral bodily movement independently of each other, stabilizing means including a pivotal connection with each gang, thereby providing three point connection with the gangs and holding them against tipping while permitting said independent movement thereof, and a seat carried by the stabilizing means.

5. A lister cultivator comprising the combination of two outer cultivator gangs and an intermediate gang, means extending from one outer gang to the other and provided with pivotal connections whereby all gangs are pivoted thereto, stabilizing means spaced rearwardly of the first mentioned means and pivotally connected to said outer gangs, and a stabilizing link pivotally connected at one end to said stabilizing means and at the other end to said intermediate gang.

6. A lister cultivator comprising the combination of two outer cultivator gangs and an intermediate gang, means extending from one outer gang to the other and provided with pivotal connections whereby all gangs are pivoted thereto, a stabilizing bar disposed rearwardly of said means and extending transversely of the gangs and having forwardly extending links pivotally connected with the outer gangs, and stabilizing means extending from said stabilizing bar and connected with said intermediate gang.

7. In a lister cultivator, the combination of three lister cultivator gangs, a first stabilizing means extending between the two outer gangs for holding the same against tipping, and a second stabilizing means pivotally connected near one end with said first stabilizing means for lateral swinging movement about a substantially vertical axis thereon, said second stabilizing means having its freely swingable end pivotally connected with said intermediate gang for holding the latter against tipping.

8. A lister cultivator comprising, in combination, a plurality of cultivator gangs including a pair of outer gangs and an intermediate gang, cultivating tools for each gang, and operating levers for said tools mounted on each of said gangs, means connecting the gangs for lateral shifting movement independently of each other, stabilizing means having connections with all of said gangs to provide for independent relative movement between said gangs, and a seat carried in fixed relation to said intermediate gang whereby the operator is always within convenient reach of the operating levers on each gang.

9. In a multiple row lister cultivator, the combination of three lister cultivator units, stabilizing means connecting the outer units comprising a transversely extending stabilizing bar and a stabilizing arm connected to said bar and adapted to swing laterally with reference to one of said units, bearing means connecting said stabilizing arm to said latter unit, and stabilizing means for the third unit, comprising a laterally and diagonally extending bar pivoted to the third unit and to said stabilizing bar.

10. In a multiple row lister cultivator, the combination of three lister cultivator units, stabilizing means connecting the outer units comprising a transversely extending stabilizing bar and a stabilizing arm connected to said bar and adapted to swing laterally with reference to one of said units, bearing means connecting said stabilizing arm to said latter unit, and stabilizing means for the third unit, comprising connecting link means pivotally connected with said third unit and extending forwardly and outwardly therefrom for connection with one end of said bar.

11. In a three-row lister cultivator, the combination of three lister cultivator gangs each comprising a wheel support and cultivating devices carried thereby, a stabilizing bar extending transversely between the two outer gangs, arms pivotally supported on said outer gangs for lateral swinging movement and having pivotal connection with the end portions of said stabilizing bar, and a second stabilizing bar having pivotal connection at one end with the intermediate gang for lateral swinging movement, the other end of said second stabilizing bar having pivotal connection with said first stabilizing bar laterally outwardly of the pivotal connection of the adjacent arm, the pivotal connections of said stabilizing bars permitting said cultivator gangs to shift transversely relatively to each other in following deviations in their plant rows.

12. In a lister cultivator, in combination, two outer cultivator gangs and an inner gang, means pivotally connecting all of said gangs for relative lateral bodily movement independently of each other, and stabilizing means including a pivotal connection with each gang, thereby providing three point connection with the gangs and holding them against tipping while permitting said independent movement thereof.

13. In a lister cultivator, in combination, two outer cultivator gangs and an inner gang, means pivotally connecting all of said gangs for relative lateral bodily movement independently of each other, and stabilizing means for the three gangs comprising a transverse bar and a diagonal bar pivotally connected with said gangs and operative to hold them from tipping while permitting the independent movement thereof.

14. In a lister cultivator, in combination, two outer cultivator gangs and an inner gang staggered relative to the outer gangs, means pivotally connecting all of said gangs for relative lateral bodily movement independently of each other, and stabilizing means for the three gangs comprising a transverse bar and a diagonal bar and means providing relatively long vertical pivots connecting said bars with said gangs, thereby holding the gangs from tipping while permitting the independent movement thereof.

15. In a three-row lister cultivator, the combination of three lister cultivator gangs, the two outer gangs being disposed in substantially the same transverse plane, the intermediate gang being disposed in rear of said transverse plane, a stabilizing bar extending transversely between the two outer gangs, arms pivotally supported on said outer gangs for lateral swinging movement and having pivotal connections with said stabilizing bar, each of said arms including a vertically disposed end providing a relatively long vertical pivot, and stabilizing means for the intermediate gang connected with said stabilizing bar.

16. In a three-row lister cultivator, the combination of three lister cultivator gangs, the two outer gangs being disposed in substantially the same transverse plane, the intermediate gang being disposed in rear of said transverse plane, a stabilizing bar extending transversely between the two outer gangs, arms pivotally supported on said outer gangs for lateral swinging movement and having pivotal connections with said stabilizing bar, each of said arms having one end vertically disposed to provide a relatively long vertical pivot for the stabilizing bar, and stabilizing means for the intermediate gang connected with said stabilizing bar.

THEOPHILUS BROWN.